(12) United States Patent
Viswanath et al.

(10) Patent No.: US 10,180,351 B2
(45) Date of Patent: Jan. 15, 2019

(54) DARK CURRENT COMPENSATION FOR PHOTON COUNTING CIRCUIT

(71) Applicant: TEXAS INSTRUMENTS INCORPORATED, Dallas, TX (US)

(72) Inventors: Rakul Viswanath, Tamil Nadu (IN); Nagesh Surendranath, Karnataka (IN); Sandeep Kesrimal Oswal, Karnataka (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 159 days.

(21) Appl. No.: 15/373,242

(22) Filed: Dec. 8, 2016

(65) Prior Publication Data

US 2017/0160129 A1 Jun. 8, 2017

(30) Foreign Application Priority Data

Dec. 8, 2015 (IN) .............. 6548/CHE/2015

(51) Int. Cl.
*G01J 1/44* (2006.01)
*G01J 1/46* (2006.01)

(52) U.S. Cl.
CPC . *G01J 1/44* (2013.01); *G01J 1/46* (2013.01); *G01J 2001/442* (2013.01); *G01J 2001/444* (2013.01)

(58) Field of Classification Search
CPC .............. G01J 2001/444; H04N 5/361
See application file for complete search history.

(56) References Cited

U.S. PATENT DOCUMENTS 3,684,378 A * 8/1972 Lord .............. G01J 1/16
250/232

OTHER PUBLICATIONS

Szczygiel: "Krummenacher feedback analysis for high-count-rate semiconductor pixel detector readout." *Mixed Design of Integrated Circuits and Systems (MIXDES), 2010 Proceedings of the 17th International Conference.* IEEE, 2010.

* cited by examiner

*Primary Examiner* — Thanh Luu
(74) *Attorney, Agent, or Firm* — John R. Pessetto; Charles A. Brill; Frank D. Cimino

(57) ABSTRACT

A circuit includes a charge sensitive amplifier (CSA) that includes an input to receive current from a photon sensor and generates an output signal that represents photons received by the sensor and dark current of the sensor. A control circuit generates a compensation signal to offset the dark current from the photon sensor at the input of the CSA. The control circuit couples feedback from the CSA to enable the compensation signal if the photon current received from the sensor is below a predetermined threshold. The control circuit decouples the feedback from the CSA to disable the compensation signal if the photon current received from the sensor is above the predetermined threshold.

18 Claims, 2 Drawing Sheets

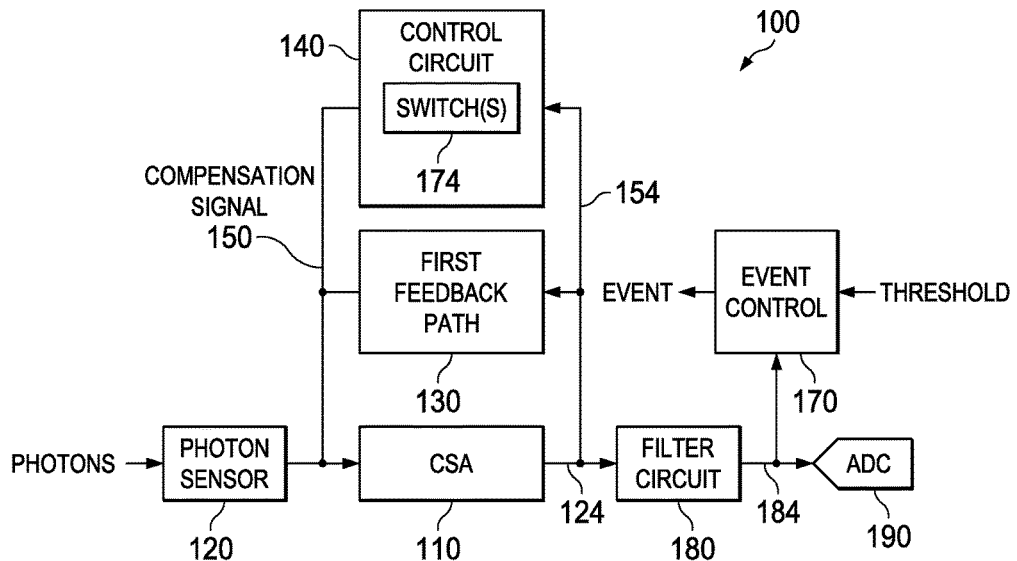
FIG. 1
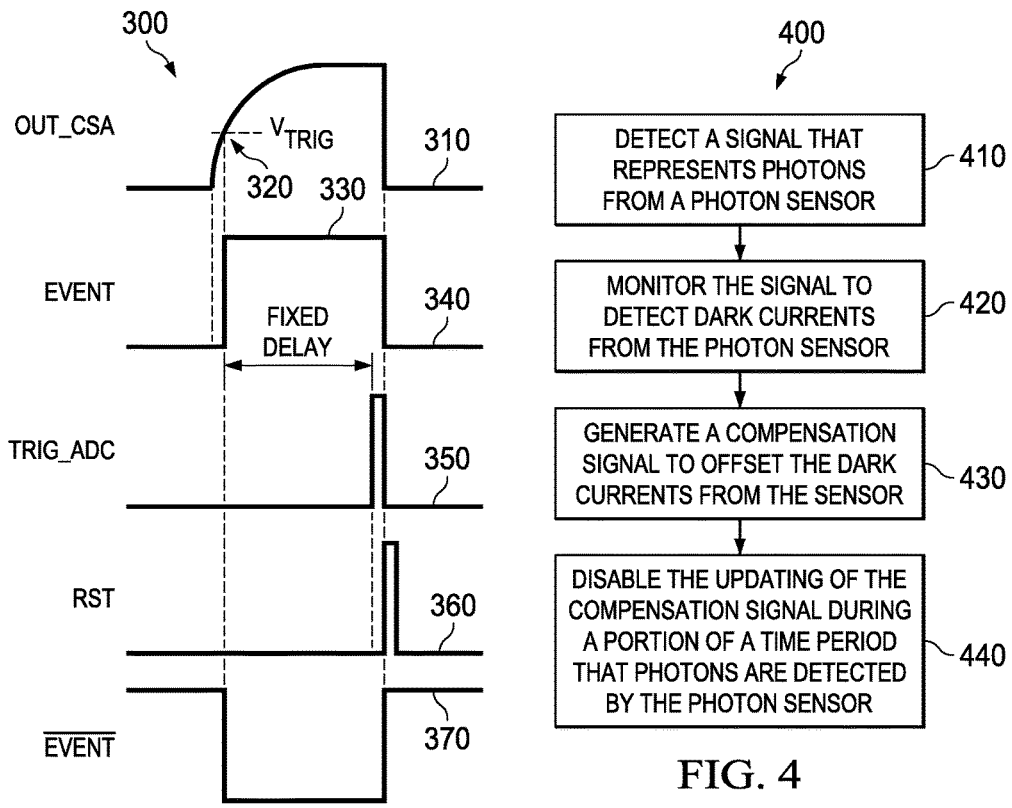
FIG. 3
FIG. 4

US 10,180,351 B2

DARK CURRENT COMPENSATION FOR PHOTON COUNTING CIRCUIT

CROSS-REFERENCE TO RELATED APPLICATION

This application claims the benefit of India Provisional Patent Application 6548/CHE/2015, filed on 8 Dec. 2015, and entitled A Dynamic Base-Line Restoration Scheme, the entirety of which is incorporated by reference herein.

TECHNICAL FIELD

This disclosure relates to a photon detection circuit and more particularly to a circuit to compensate for dark currents from photon sensors in photon counting systems.

BACKGROUND

Photon counting systems employ sensors that react to photon inputs where inputs to the photon counting system are asynchronous. The number of photons arriving in unit time follows the Poisson distribution and the inter-arrival times between photons follows an exponential distribution. Theoretically, two photons may arrive with an infinitesimally small duration between them. Thus, it may not be possible to count all photons distinctly using a finite bandwidth system. To be able to count all photons distinctly, one would need an infinite bandwidth counting system, which is not practically realizable. The loss of counts due to a finite bandwidth counting system is not a problem as long as the system dead-time is well defined. The dead-time of a counting system may refer to the minimum separation in time between two incoming photons so that they are both recorded distinctly. For a non-paralyzable counting system, the input to output gain can be given by: $n\_m/n\_T = 1/(1+n\_T \cdot t\_D)$, where $n\_m$=Measured rate, $n\_T$=True rate, and $t\_D$=dead-time.

Counting systems with a higher dead-time are likely to cause more error owing to variation in dead-time and other non-idealities. Hence, to achieve suitable system performance, it is desirable that the dead-time be held as small as possible. The detector's response time also contributes to the overall dead-time. To control this value, the detector is generally biased with a very large reverse bias (e.g., up to 2000V). As a result, a current flows through the detector even when no x-ray photons are incident. This current is known as 'dark current'. The current pulses that result when a photon is incident on the detector ride over this dark current. The dark current from the detector, if not compensated for, can cause dynamic range and energy resolution issues.

SUMMARY

This disclosure relates to a circuit to compensate for dark currents from photon sensors in photon counting systems. In one example, a circuit includes a charge sensitive amplifier (CSA) that includes an input to receive current from a photon sensor and generates an output signal that represents photons received by the sensor and dark current of the sensor. A control circuit generates a compensation signal to offset the dark current from the photon sensor at the input of the CSA. The control circuit couples feedback from the CSA to enable the compensation signal if the photon current received from the sensor is below a predetermined threshold. The control circuit decouples the feedback from the CSA to disable the compensation signal if the photon current received from the sensor is above the predetermined threshold.

In another example, an integrator includes an input to receive photon current and dark current from a photon sensor and generates an output signal that represents the photon current and the dark current received by the sensor at the input. An amplifier generates a compensation signal based on the output signal to offset dark current from the photon sensor at the input of the integrator. A switching circuit couples the output signal to the input of the amplifier during a time period when received photon current is below a predetermined threshold and decouples the output signal from the input of the amplifier during another time period when received photon current is above the predetermined threshold.

In yet another example, a method includes detecting a signal that represents photons from a photon sensor. The method includes monitoring the signal to detect dark currents from the photon sensor. The method includes generating a compensation signal to offset the dark currents from the sensor. The method includes disabling the updating of the compensation signal during a portion of a time period that photons are detected by the photon sensor.

BRIEF DESCRIPTION OF THE DRAWINGS

FIG. 1 illustrates an example schematic block diagram of a circuit to compensate for dark currents in a photon counting system.

FIG. 3 illustrates an example signal diagram for a dark current compensation circuit.

FIG. 4 illustrates an example method to compensate for dark currents in a photon counting system.

DETAILED DESCRIPTION

Figure 2:
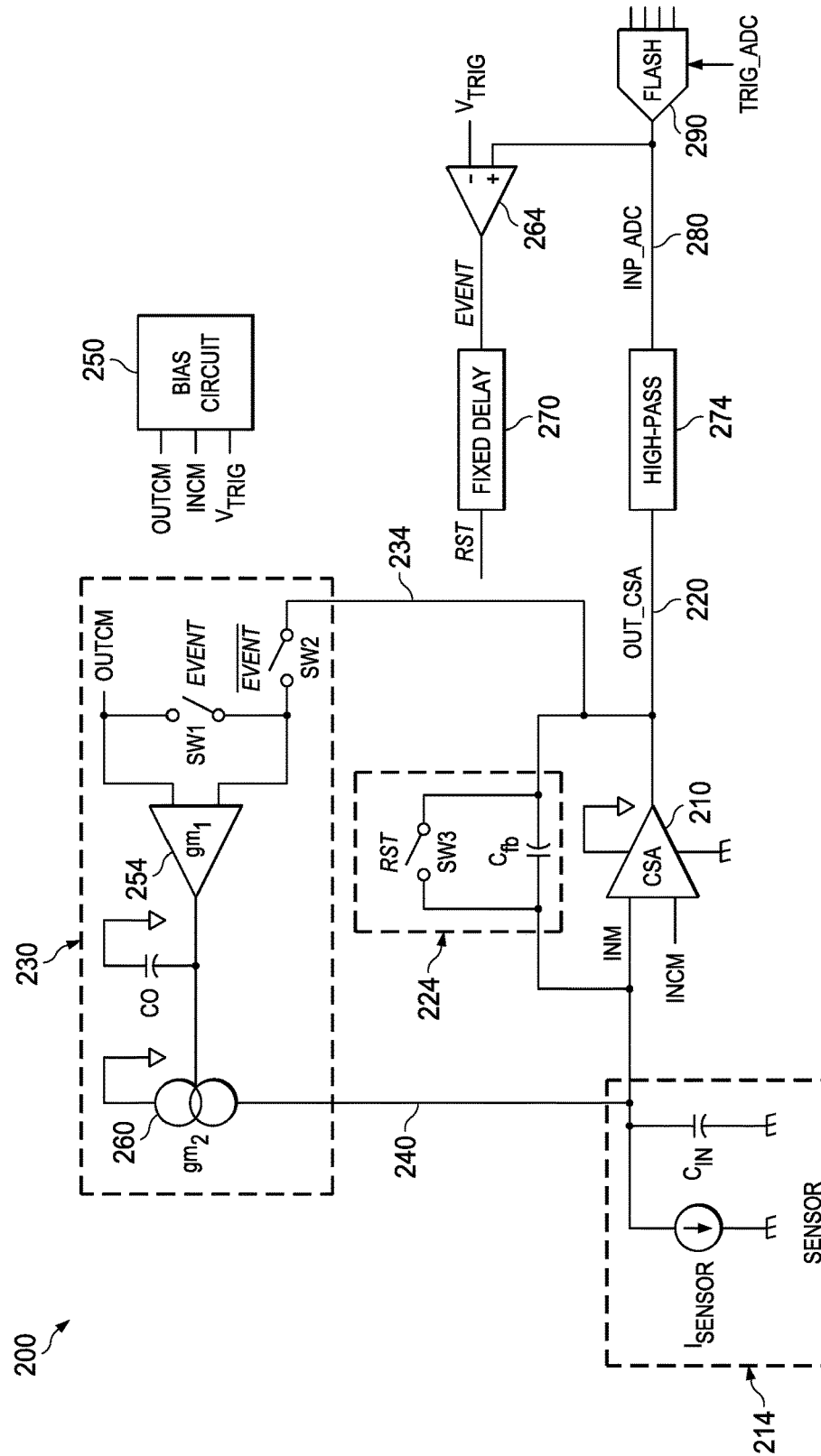
FIG. 2 illustrates an example circuit diagram of a circuit to compensate for dark currents in a photon counting system.

This disclosure relates to a circuit to compensate for dark currents from photon sensors in photon counting systems. Dark currents represent current from a photon sensor that is unrelated to the current generated by the sensor when incident photons arrive at the sensor. The circuits disclosed herein utilize switching and control circuits that mitigate dead-time signal complexities of conventional circuits where dead-time of a counting system may refer to the minimum separation in time between two incoming photons so that they are both recorded distinctly. In conventional approaches, circuit dead-time can be set using passive resistor/capacitor (RC) shapers where the width of the voltage/current pulse is a function of the shaper's time-constant. Such circuits can compensate for dark current, however, the simple RC shaper causes the dead-time to depend strongly on the energy of the incoming photon which is undesirable. This causes difficulties in correctly estimating the number of photons incident on the sensor. As a result, conventional photon counting systems with high-rate support invariably end up needing higher power to meet a given noise specification. Also, the passive RC-shaper in the feedback path causes a shift in the dark current baseline depending on the mean input flux.

The circuits disclosed herein include dark current compensation yet mitigate the impact of incoming photons on such compensation by momentarily disconnecting the dark current compensation during periods when photons are detected. As such, neither the photon detection circuits nor the dark current compensation circuits described herein affect the corresponding operation of the other respective circuits when active. In one example, a circuit includes a charge sensitive amplifier (CSA) that includes an input to receive current from a photon sensor and generates an output signal that represents photon current and dark current received by the sensor at the input. The CSA includes a feedback path to feedback the output signal to the input of the CSA for detection of photons and dark current from the photon sensor.

A control circuit operates another feedback path to offset dark current from the photon sensor at the input of the CSA. The control circuit generates a compensation signal to offset the dark current from the photon sensor at the input of the CSA and is disabled during a portion of a time period that photons are detected by the CSA. Event detection can be provided where filtered output signals representing detected photons are compared to a predetermined threshold. If no photons are detected based on the event detection, the circuit operates in continuous dark current compensation mode. If photons are detected, dark current compensation is momentarily switched off while incident photons are detected and counted. In this manner, photon detection and dark current compensation circuits do not cause photon energy interference between counting and compensation as with conventional circuits.

FIG. 1 illustrates an example of a circuit 100 to compensate for dark currents in a photon counting system. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example.

As shown in the example of FIG. 1, the circuit 100 includes a charge sensitive amplifier (CSA) 110 that that includes an input to receive dark current and photon current from a photon sensor 120. As used herein, the term dark current refers to unwanted current from the photon sensor 120 that is unrelated to the current associated with incident photons arriving at the sensor. The dark current of the photon sensor 120 can vary based on temperature changes and/or based on average photon flux at the sensor where the higher the amount of incoming photons received by the sensor over a given time period can cause a higher amount of dark current. The CSA 110 generates an output signal 124 that represents photons and dark current received by the sensor 120 at the input. The CSA 110 includes a first feedback path 130 to feedback the output signal 124 to the input of the CSA 110 for detection of photons and dark current from the photon sensor 120. A control circuit 140 generates a compensation signal 150 to offset the dark current from the photon sensor at the input of the CSA 110. The control circuit 140 couples feedback 154 from the CSA 110 to enable the compensation signal 150 if the photon current received from the sensor is below a predetermined threshold (e.g., indicating that photons are not detected). The control circuit 140 decouples the feedback 154 from the CSA 110 to disable the compensation signal 150 if the photon current received from the sensor is above the predetermined threshold (e.g., indicating photons are detected).

In an example, the CSA 110 can include a capacitor in the feedback path 130 from the output of the CSA to the input to integrate the photon current received and the dark current from the photon sensor 120. A bias circuit (see e.g., FIG. 2) can generate an input bias voltage at another input to the CSA 110 and also generate an output bias voltage to an input of the control circuit 140 to mitigate common mode voltage at the input of the CSA and at the input of the control circuit. In one example, the input bias voltage and the output bias voltage can be set to the same voltage level or in another example set to different voltage levels via the bias circuit. Also, the bias circuit can adjust the output bias voltage at the input of the control circuit 140 based on detected changes of dark current from the photon sensor 120 where the detected changes are based in part on detected changes in temperature of the photon sensor, for example.

The control circuit 140 can also include an amplifier and an adjustable current source. The amplifier amplifies the output signal 124 via feedback 154 from the CSA 110 and an internal reference voltage and drives the adjustable current source to offset the dark current at the input of the CSA based on the output signal from the CSA. When photons are detected, an event control circuit 170 generates an event signal EVENT that controls switches 174 in the control circuit 140 to momentarily discontinue dark current compensation during periods of photon detection. The event control circuit 170 can include a comparator that receives a predetermined trigger voltage from the bias circuit and generates the event signal EVENT to disable the feedback path 130 (e.g., disconnect feedback) during a portion of the time period that photons are detected by the CSA 110. A delay circuit (see e.g., FIG. 2) can be employed to generate a reset signal from the event signal EVENT where the reset signal can be employed to discharge the capacitor in the feedback path 130. A high pass filter 180 can be utilized at the output of the CSA 110 to filter the output signal 124 into a filtered signal 184. An analog to digital converter (ADC) 190 can record the photon energy level of the filtered output signal 184.

FIG. 2 illustrates an example of a circuit 200 to compensate for dark currents in a photon counting system. The circuit 200 includes a charge sensitive amplifier (CSA) 210 operating as an integrator that includes an input (INM) to receive current from a photon sensor 214 and generates an output signal 220 that represents photon current and dark current received by the sensor at the input. The sensor 214 can be modeled as a current source ISENSOR in parallel with a parasitic capacitance CIN. The CSA 210 includes a first feedback path 224 to feedback the output signal 220 to the input INM of the CSA 210 for detection of photon current and dark current from the photon sensor 214. A control circuit 230 receives feedback via a second feedback path 234 of the CSA 210 to offset dark current from the photon sensor at the input of the CSA. The control circuit 230 generates a compensation signal 240 to offset the dark current from the photon sensor 214 at the input of the CSA 210. The feedback 234 is disabled via switches SW1 and SW2 during a portion of a time period that photons are detected by the CSA 210.

The CSA 210 includes a capacitor CFB to integrate the output signal 220 with respect to the input signal INM. A bias circuit 250 generates an input bias voltage shown as input common mode (INCM) at another input to the CSA 210 to enable generation of the output signal 220 and to mitigate common mode voltages at the input INM. As shown, the bias circuit 250 also generates a bias voltage output common mode voltage (OUTCM) to an input of the control circuit 230 and to also mitigate common mode voltage at the input of the control circuit. In one example, the input bias voltage INCM and the output bias voltage OUTCM can be set to the same voltage level. In another example, these voltages can be set to different voltage levels via the bias circuit 250 In yet another example, the bias circuit 250 can adjust the output bias voltage OUTCM at the input of the control circuit 230 based on detected changes of dark current from the photon sensor where the detected changes are based in part on detected changes in temperature of the photon sensor (e.g., the bias circuit receives temperature sensor input to adjust OUTCM).

The control circuit 230 includes switches SW1 and SW2 to disable the second feedback path 234 during a portion of the time period that photons are detected by the CSA 210. The switches SW1 and SW2 enable an amplifier 254 to provide dark current compensation when photons are not detected by closing SW1 and opening SW2. Output from the amplifier 254 drives an adjustable current source 260 to generate the compensation signal 240 to the CSA 210. The adjustable current source 260 offsets the dark current at the input INM of the CSA 210 based on the output signal 220. Dark current is generally received as a lower level AC noise signal that is lower in energy from that of received photon energy. Thus, as long as no current photon current is received (e.g., current above a threshold value), the circuit 200 remains in dark current compensation mode. If photon energy received is above the threshold value, dark current compensation is momentarily switched off via SW1 and SW2 (e.g., by closing SW1 and opening SW2) while photon energy is received and recorded.

A comparator 264 (e.g., event detector) receives a predetermined trigger voltage VTRIG from the bias circuit 250 and generates an event signal EVENT to disable the second feedback path 234 (e.g., via /EVENT signal controlling SW2) during a portion of the time period that photons are detected by the CSA 210. A delay circuit 270 generates a reset signal RST from the event signal EVENT. The reset signal RST is employed to discharge the capacitor CFB. A high pass filter 274 filters the output signal 220 and generates output 280 which is utilized by comparator 264 to generate the event signal EVENT based on the threshold VTRIG. The filtered output 280 can be processed by an ADC 290 (e.g., FLASH ADC) to determine the received photon energy.

The front-end integrator CSA 210, in this example, is generally always ON. A static 'event-detect' comparator 264, which in this example is also always ON, observes the output of the filter 274 at 280. An analog control path 234 is configured in feedback around the CSA 210. The analog circuit 230 continuously monitors the output of the CSA 210 and attempts to hold it at an appropriate common-mode potential to mitigate dark current from the sensor 214. When a photon event arrives, the CSA 210 builds a sufficiently large voltage at its output at 220. This causes the event-detect comparator 264 to toggle. The feedback in the analog control path 234 is temporarily disconnected via SW2 and SW1. The feedback capacitor CFB is reset via switch SW3 after a fixed delay at 270 resulting in a well-defined dead-time. The dead-time may be equal to the time duration from about the time the event arrived to the time when the feedback capacitor FB is reset.

The ADC 290 can be triggered just before this reset, thus converting the settled voltage at output of the CSA 210. The feedback in the analog control path 234 can then be connected back so that it can continue to track slow changes in the dark current. The generation of the signal EVENT indicating arrival of a photon also allows the counting system to define its own counting dead-time. The baseline restoration for dark current tracks accurately slow changes in the dark current which can result from changes in the operating temperature of the sensor 214, for example. Knowledge of arrival of an event allows use of the switched feedback architecture described herein. This facilitates that the dark current compensation feedback doesn't compensate for photon signal current resulting from incident photons as in prior circuits.

The circuit 200 enables the use of a low-threshold 'event-detect' comparator 264 to determine arrival of a photon. This allows for active reset of the feedback capacitor CFB after a deterministic delay from time of arrival of a detected photon. This also facilitates the use of dynamic control via SW1 and SW2 in the dark current feedback path 234.

FIG. 3 illustrates an example signal diagram 300 for a dark current compensation circuit. A signal 310 illustrates an output from the CSA described herein when a photon is received by the sensor. At a given threshold voltage VTRIG shown at 320, an event detect signal 330 is activated. The event detect signal 330 would correlate to SW2 being opened and SW1 being closed in the circuit 200 described above. When the event detect is inactive such as shown at 340 (see /EVENT signal 370), the analog control circuit described herein can compensate for dark current via the amplifier and adjustable current source described herein. At 350, after a fixed delay, an ADC trigger signal is generated. At the conclusion of 350, a reset CFB signal 360 is generated where the CSA feedback capacitor CFB is reset via the SW3 described herein (e.g., by closing SW3). At 370, a /EVENT signal (inverse of EVENT 340) is generated where SW2 is closed and SW1 is opened.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 4 illustrates an example method 400 to compensate for dark currents in a photon counting system. At 410, the method 400 includes detecting a signal that represents photons from a photon sensor (e.g., via CSA 110 of FIG. 1). At 420, the method 400 includes monitoring the signal to detect dark currents from the photon sensor (e.g., via analog control 140 of FIG. 1). At 430, the method 400 includes generating a compensation signal to offset the dark currents from the sensor (e.g., via analog control 140 of FIG. 1). At 440, the method 400 includes disabling the updating of the compensation signal during a portion of a time period that photons are detected by the photon sensor (e.g., via event control 170 of FIG. 1). Although not shown, the method 400 can also include generating an integrated signal from the signal that represents photons from the photon sensor. This can include resetting the integrated signal after the portion of the time period that photons are detected by the photon sensor.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
   a charge sensitive amplifier (CSA) that includes an input to receive current from a photon sensor and generates an output signal that represents photons received by the sensor and dark current of the sensor; and
   a control circuit to generate a compensation signal to offset the dark current from the photon sensor at the input of the CSA, wherein the control circuit couples feedback from the CSA to enable the compensation signal if the photon current received from the sensor is below a predetermined threshold and decouples the feedback from the CSA to disable the compensation signal if the photon current received from the sensor is above the predetermined threshold;
   wherein the CSA includes a capacitor in a feedback path from the output of the CSA to the input to integrate the current received and the dark current from the photon sensor.

2. The circuit of claim 1, further comprising a bias circuit to generate an input bias voltage at another input to the CSA and to generate an output bias voltage to an input of the control circuit to mitigate common mode voltage at the input of the CSA and at the input of the control circuit.

3. The circuit of claim 2, wherein the input bias voltage and the output bias voltage are set to the same voltage level or set to different voltage levels via the bias circuit.

4. The circuit of claim 3, wherein the bias circuit adjusts the output bias voltage at the input of the control circuit based on detected changes of dark current from the photon sensor, the detected changes based in part on detected changes in temperature of the photon sensor.

5. The circuit of claim 4, the control circuit further comprising an amplifier and an adjustable current source, the amplifier amplifies the output signal from the CSA and drives the adjustable current source to offset the dark current at the input of the CSA based on the output signal from the CSA.

6. The circuit of claim 4, further comprising a comparator that receives a predetermined trigger voltage from the bias circuit and generates an event signal indicating a photon has been received, the event signal disables the compensation signal during the portion of a time period that photons are detected by the CSA.

7. The circuit of claim 6, further comprising a delay circuit to generate a reset signal from the event signal, the reset signal employed to discharge the capacitor in the feedback path.

8. A circuit, comprising:
   a charge sensitive amplifier (CSA) that includes an input to receive current from a photon sensor and generates an output signal that represents photons received by the sensor and dark current of the sensor; and
   a control circuit to generate a compensation signal to offset the dark current from the photon sensor at the input of the CSA, wherein the control circuit couples feedback from the CSA to enable the compensation signal if the photon current received from the sensor is below a predetermined threshold and decouples the feedback from the CSA to disable the compensation signal if the photon current received from the sensor is above the predetermined threshold;
further comprising a high pass filter at the output of the CSA to filter the output signal.

9. The circuit of claim 8, further comprising an analog to digital converter (ADC) to record the photon energy level of the filtered output signal.

10. A circuit, comprising:
    an integrator that includes an input to receive photon current and dark current from a photon sensor and generates an output signal that represents the photon current and the dark current received by the sensor at the input;
    an amplifier to generate a compensation signal based on the output signal to offset dark current from the photon sensor at the input of the integrator; and
    a switching circuit to couple the output signal to the input of the amplifier during a time period when received photon current is below a predetermined threshold and to decouple the output signal from the input of the amplifier during another time period when received photon current is above the predetermined threshold.

11. The circuit of claim 10, wherein the integrator includes a feedback capacitor to integrate the photon current and the dark current from the photon sensor.

12. The circuit of claim 11, further comprising a bias circuit to generate an input bias voltage at another input to the integrator and to generate an output bias voltage to an input of the amplifier to mitigate common mode voltage at the input of the integrator and at the input of the amplifier.

13. The circuit of claim 12, wherein the input bias voltage and the output bias voltage are set to the same voltage level or set to different voltage levels via the bias circuit.

14. The circuit of claim 13, wherein the bias circuit adjusts the output bias voltage at the input of the amplifier based on detected changes of dark current from the photon sensor, the detected changes based in part on detected changes in temperature of the photon sensor.

15. The circuit of claim 14, further comprising an adjustable current source, wherein the amplifier drives the adjustable current source to offset the dark current at the input of the integrator based on the output signal from the integrator.

16. The circuit of claim 14, further comprising a comparator that receives a predetermined trigger voltage from the bias circuit and generates an event signal indicating a photon has been received, the event signal disables the compensation signal during the portion of a time period that photons are detected by the integrator.

17. The circuit of claim 16, further comprising a delay circuit to generate a reset signal from the event signal, the reset signal employed to discharge the feedback capacitor.

18. A method, comprising:
    detecting a signal that represents photons from a photon sensor;
    monitoring the signal to detect dark currents from the photon sensor;
    generating a compensation signal to offset the dark currents from the sensor; and
    disabling the updating of the compensation signal during a portion of a time period that photons are detected by the photon sensor;
    further comprising:
    generating an integrated signal from the signal that represents photons from the photon sensor; and
    resetting the integrated signal after the portion of the time period that photons are detected by the photon sensor.

* * * * *